J. C. LEWIS.
VEHICLE WHEEL WITH PERMANENT RIM OR METAL FELLY.
APPLICATION FILED AUG. 5, 1920.

1,400,828.

Patented Dec. 20, 1921.

Inventor:
James C. Lewis,
By his attorney,
Charles N. Gooding.

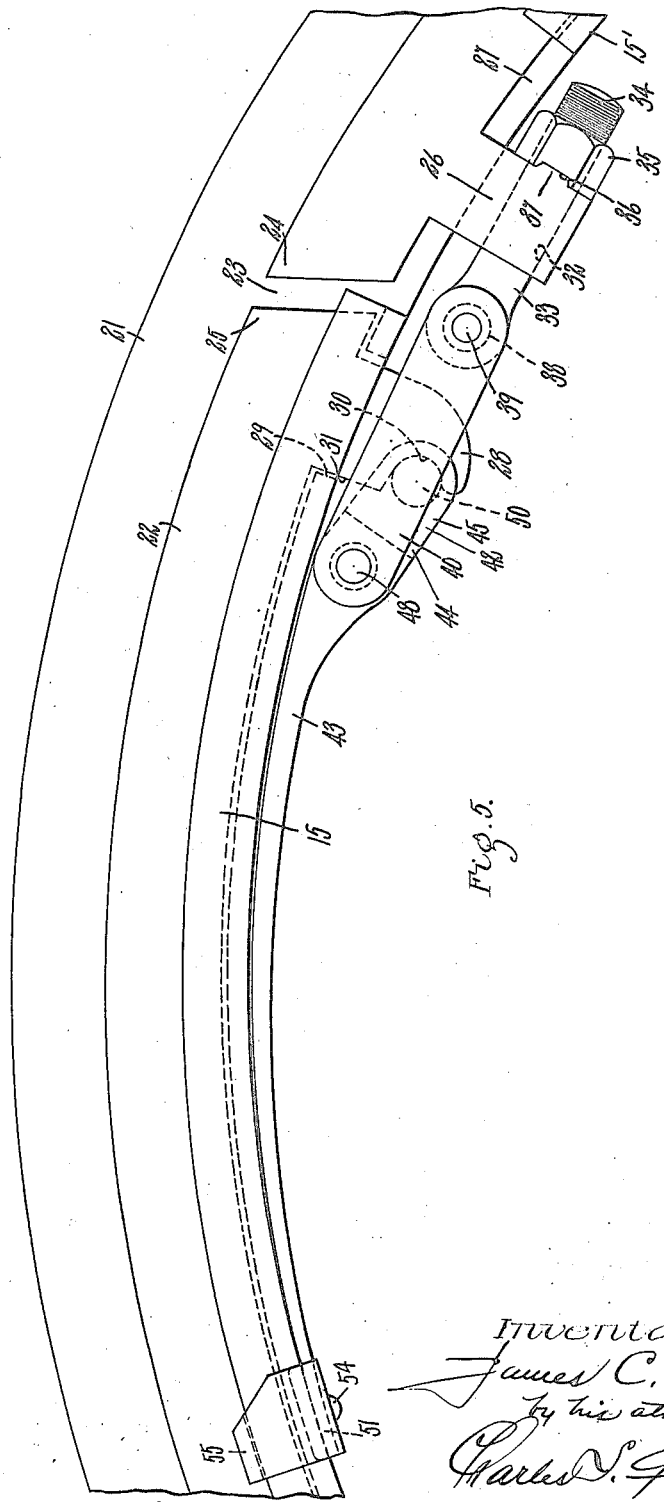

UNITED STATES PATENT OFFICE.

JAMES C. LEWIS, OF PORTLAND, MAINE.

VEHICLE-WHEEL WITH PERMANENT RIM OR METAL FELLY.

1,400,828. Specification of Letters Patent. Patented Dec. 20, 1921.

Application filed August 5, 1920. Serial No. 401,468.

*To all whom it may concern:*

Be it known that I, JAMES C. LEWIS, a citizen of the United States, residing at Portland, in the county of Cumberland and State of Maine, have invented new and useful Improvements in Vehicle-Wheels with Permanent Rims or Metal Fellies of which the following is a specification.

This invention relates to vehicle wheels particularly for automobiles having a metal felly with a demountable rim directly mounted on the felly of the wheel and locked in position thereon by a split locking ring, the ends of which are drawn together by means of a lever.

The object of the invention is to provide a strong, durable wheel for vehicles with a metal felly and means for locking a demountable rim on the felly, which means can be quickly operated either to lock the demountable rim on the felly or to unlock it therefrom.

The invention consists in the improved wheel with metal felly and the improved means for locking a demountable rim on said felly, all as hereinafter set forth in the specification and particularly pointed out in the claims.

Referring to the drawings:

Fig. 5 is a detail sectional elevation on an enlarged scale illustrating the ring contracting mechanism.

Like numerals refer to like parts throughout the several views of the drawings.

Figure 1:
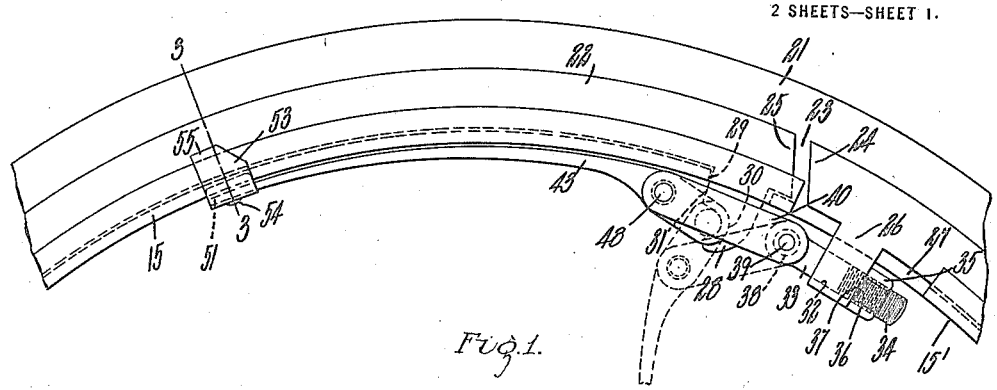
Figure 1 is a front elevation of a portion of my improved vehicle wheel felly and demountable rim, together with the locking ring for holding the rim in position on the felly.
Figure 2:
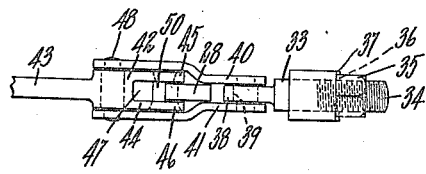
Fig. 2 is an underneath plan of the locking means, the lever being shown broken away.
Figure 3:
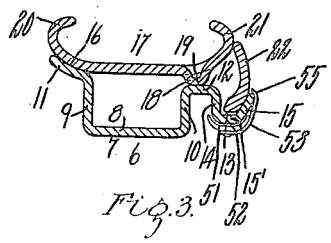
Fig. 3 is a sectional elevation taken on the line 3—3, Fig. 1.
Figure 4:
Fig. 4 is a detail side elevation of the locking lever.

In the drawings, 6 is a permanent rim for a wheel which is made of metal, preferably of steel. By the term permanent rim it is intended to include the steel rim surrounding a wood wheel, the metal felly of a steel wheel, the metal rim of a wire wheel, and in fact the permanent metallic portion of the wheel rim whether the body of the wheel be made of wood, metal, or a combination of materials. The permanent rim comprises in cross section a U-shaped portion 7 having a base 8 and flanges 9 and 10. The flange 9 has a laterally extending flange 11 extending along the outer edge thereof and the flange 10 has a cylindrical flange 12 extending around the outer edge thereof and provided with an annular groove 13, one wall 14 of the annular groove being substantially parallel with the flanges 9 and 10, the other wall 15 of said groove being inclined outwardly at an angle. The walls 14 and 15 are connected together by a base 15′. The flange 11 is preferably concave along its outer surface at 16, and forms a seat for one side of a demountable rim 17. The other side of said demountable rim is provided with an inwardly projecting flange 18 which is V-shaped in cross section and is provided with a flattened portion 19 which rests upon the flat portion of the flange 12. Said demountable rim terminates on its opposite sides in concave flanges 20 and 21 to receive the tire in the usual manner. The demountable rim 17 is held in position on the permanent rim 6 as illustrated in Fig. 3 by a split ring 22, the inner edge of which projects into the annular groove 13 in the permanent rim 6. The ring 22 is split at 23, Fig. 1, the adjacent ends 24 and 25 of the split ring being preferably inclined at an angle to the outer and inner edges thereof. The end 24 of the split ring 22 has a lug 26 thereon projecting inwardly from the inner edge thereof and through a slot 27 provided in the wall 15 and base 15′ of the permanent rim 6. The other end 25 of the split ring 22 is also provided with a lug 28 which projects through a hole 29 in the base 15′. This lug has a notch 30 in the rear edge 31 thereof. The lug 26 has a hole 32 extending therethrough through which projects a stud 33 which is screw-threaded at 34 to receive a nut 35. The nut 35 has a slot 36 extending thereacross and adapted to receive projections 37 located on the rear edge of the lug 26. The opposite end of the stud 33 is provided with an eye 38 through which a pivot 39 extends, the pivot 39 being rigidly fastened to the stud 33, and projecting beyond the stud on opposite sides thereof as shown in Fig. 2 to receive one end of each of a pair of links 40 and 41. The links 40 and 41 straddle one end 42 of a lever 43 which is bifurcated at 44 to receive the inner end of the lug 28 and said links are pivoted to said lever at 48. The two arms 45 and 46 which form the bifurcated end of the lever 43 have a slot 47 therebetween into which the end of the lug 28 projects and a stud 50 is fastened at its opposite ends to the arms 45 and 46 and projects through the slot 47. The lever 43 at its free end 51 is channeled or slotted at 52 to receive the base 15' of the flange containing the annular groove 13 of the permanent rim 6 and a thin flat spring 53 is fastened by a rivet 54 to the outer free end of the lever 43, and when the lever is in its closed or locking position the upper flanged portion 55 of the spring 53 projects over and engages the upper edge of the flange wall 15 of the permanent rim, thus locking the lever in closed or clamping position.

The general operation of the device hereinbefore specifically described is as follows: The split ring 22 is slipped into position in the annular groove 13 in the felly band 6 with the lever 43 and the links 40 and 41 in the relative positions to the stud 33 illustrated in dotted lines Fig. 1. The lever is then moved outwardly at its free end to the position shown in full lines, Fig. 1, and the free end of the lever engages the base 15' of the permanent rim 6. At this time the upper end 55 of the spring 53 snaps over the upper edge of the flange wall 15 and locks the lever and its links in position with the ring clamped in the annular groove 13 and with its upper edge bearing against the side 21 of the demountable rim 17 thus clamping the demountable rim and the tire that may be thereon in position directly upon the permanent rim 6. When in this position it will be seen by reference to Figs. 1 and 5 that the center of the stud 50 lies inside a line joining the centers of the pivotal studs 48 and 39, so that any force tending to expand the split ring and thus exerting a pull away from the free end of the lever 43 between the pivots 39 and 48 and through the links 40 and 41 will, by reason of the center of the stud 50 being located inside a straight line joining the pivots 39 and 48, act to force the free end of the lever 43 outwardly and against the rim 15. During this operation of contracting the ring and clamping the demountable rim in position, the stud 50 rocks upon the lug 28 in the notch 30 and the links rock upon the pivot 39 in the stud 33. Since the lug 28 is located in the hole 29 it remains practically stationary during this operation, while the end 24 of the split ring 22 is brought toward the end 25 of said split ring, thus contracting the ring as a whole and firmly clamping the demountable rim in position. It will be noted that during this clamping and locking operation the tendency of contracting the ring 22 will be to force it downwardly or inwardly in the annular groove 13 and as said annular groove has an inclined wall 15 the result will be that the split ring 22 will not only be contracted circumferentially thereof, but will be forced laterally thereof toward the demountable rim, thus forcing said demountable rim laterally thereof against the flange 11, whereby said demountable rim will be firmly held in position directly upon the permanent rim of the wheel and resting upon the flange 11 and the flange 12 of said permanent rim. In removing the demountable rim from the permanent rim, the ring is first allowed to expand by throwing the lever 43 into the position illustrated in dotted lines, Fig. 1. This will allow the ring 22 to expand, the end 24 moving away from the end 25, and it can then be removed from the annular groove 13 by lifting the end 24 out of said annular groove by means of the lever 43 and links 40 and 41, and then springing the rest of the ring out of the groove circumferentially thereof from the end 24 toward the end 25.

I claim:

1. A vehicle wheel, a permanent rim encircling said wheel, a demountable rim encircling said permanent rim in contact therewith, said permanent rim being provided with an annular groove, a split locking ring located in said annular groove, a lug extending inwardly from each of the adjacent ends of said locking ring respectively, a pair of links, a pivot connecting one end of each link to one of said lugs, said links extending from said pivot beyond the other of said lugs, a second pivot on the opposite ends of said links, a lever pivoted intermediate its ends upon said second pivot, one end of said lever being adapted to engage said last named lug, the other end of said lever being adapted to be swung outwardly to contract said split ring until its median point of contact with said last-named lug passes inwardly beyond a straight line connecting the median lines of said pivots.

2. A vehicle wheel, a permanent rim encircling said wheel, a demountable rim encircling said permanent rim in contact therewith, said permanent rim being provided with an annular groove, a split locking ring located in said annular groove, a lug extending inwardly from each of the adjacent ends of said locking ring respectively, a pair of links, pivotally supported by one of said lugs, said links extending from said pivot beyond the other of said lugs, a second pivot on the opposite end of said link, a lever pivoted intermediate its ends upon said second pivot, one end of said lever being pivotally supported on said last-named lug, the other end of said lever being adapted to be swung outwardly to contract said split ring until its median point of contact with said last-named lug passes inwardly beyond a straight line connecting the median lines of said pivots and its free end contacts with said permanent rim.

3. A vehicle wheel, a permanent rim encircling said wheel, a demountable rim encircling said permanent rim in contact therewith, said permanent rim being provided with an annular groove, a split locking ring located in said annular groove, a lug extending inwardly from each of the adjacent ends of said locking ring respectively, a link, a pivot connecting one end of said link to one of said lugs, said link extending from said pivot beyond the other of said lugs, a second pivot on the opposite end of said link, a lever pivoted intermediate its ends upon said second pivot, one end of said lever being adapted to engage said last-named lug, the other end of said lever being adapted to be swung outwardly to contract said split ring and into contact with said permanent rim, the parts being so constructed and arranged relatively to each other when the free end of said lever contacts with said permanent rim that a force exerted upon said link in line with the centers of both of said pivots and directed away from the free end of said lever will force said free end toward the portion of said permanent rim adjacent thereto.

4. A vehicle wheel including a permanent rim surrounding the wheel, said rim comprising a U-shaped portion with laterally extending flanges on its opposite sides, one of said flanges being cylindrical and having an annular groove therein adapted to receive a split locking ring.

5. A vehicle wheel including a permanent rim surrounding the wheel, a demountable rim encircling said permanent rim in contact therewith, said permanent rim being provided with an annular groove, a split locking ring located in said annular groove, a lug extending inwardly from each of the adjacent ends of said locking ring respectively, a stud extending through one of said lugs and fast thereto, a pair of links pivoted to said stud at one end thereof, a lever pivoted to said links at the opposite end thereof from said pivot, and a stud extending transversely of said lever and adapted to engage a notch provided in one edge of the other of said lugs.

6. A vehicle wheel, a permanent rim encircling said wheel, a demountable rim encircling said permanent rim in contact therewith, said permanent rim being provided with an annular groove, a split locking ring located in said annular groove, a lug extending inwardly from each of the adjacent ends of said locking ring respectively, a stud constituting a pivot extending through one of said lugs and fast thereto, a pair of links engaging said stud at one end thereof, a pivot on the opposite ends of said links, a lever mounted on said last-named pivot and a stud extending transversely of said lever and adapted to engage a notch provided in one edge of the other of said lugs, said last-named lug being located between said pivots, the free end of said lever being adapted to engage said permanent rim when the parts are relatively positioned to contract said ring, the center of said last-named stud being located inside a line joining the centers of said pivots when the free end of said lever is in contact with said permanent rim.

7. A vehicle wheel, including a permanent rim, a demountable rim encircling said permanent rim in contact therewith, a laterally extending flange on said permanent rim having an annular groove therein, a split locking ring located in said annular groove and means to contract said locking ring by forcing one of the ends of the same toward the other, whereby said demountable rim may be locked in position upon said permanent rim, said means for contracting said split ring including a lever and a spring fast to the free end of said lever and adapted to project over the outer edge of the grooved flange on said permanent rim, whereby said lever may be locked in position with said locking ring contracted.

8. A vehicle wheel, a metal rim thereon, a demountable rim encircling said rim, a laterally extending flange on said rim having an annular groove therein, a split locking ring located in said annular groove, a lug extending inwardly from each of the adjacent ends of said locking ring respectively and means to contract said locking ring by forcing one of the ends of the same toward the other, whereby said demountable rim may be locked in position on said rim, said means for contracting said split ring, including a lever with a bifurcated end through which bifurcated end one of said lugs projects.

9. A vehicle wheel, a metal rim thereon, a demountable rim encircling said rim in contact therewith, said first rim being provided with an annular groove, a split locking ring located in said annular groove, a lug extending inwardly from each of the adjacent ends of said locking ring respectively, a pair of links pivotally connected at one end thereof to one of said lugs, a lever pivoted to said links at the opposite end thereof and having a bifurcated end projecting between said links, a stud extending transversely of the bifurcated portion of said lever and adapted to engage a notch in one edge of the other of said lugs, said last-named lug projecting through the bifurcated portion of said lever.

In testimony whereof I have hereunto set my hand in presence of two subscribing witnesses.

JAMES C. LEWIS.

Witnesses:
CHARLES S. GOODING,
CATHERINE M. JOYCE.